United States Patent
Hopper et al.

(10) Patent No.: US 7,061,391 B2
(45) Date of Patent: Jun. 13, 2006

(54) METHOD, SYSTEM, AND PROGRAM FOR MONITORING A CONSUMABLE RESOURCE USED BY A SYSTEM

(75) Inventors: Samuel Neely Hopper, Longmont, CO (US); Eric W. Jepsen, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 09/981,560

(22) Filed: Oct. 17, 2001

(65) Prior Publication Data

US 2003/0071726 A1 Apr. 17, 2003

(51) Int. Cl.
*G08B 3/00* (2006.01)

(52) U.S. Cl. ............... 340/691.1; 340/691.6; 340/525; 340/540; 340/635; 399/24; 399/27; 399/29

(58) Field of Classification Search .......... 340/691.1, 340/691.6, 525, 540, 635, 653; 347/7, 86; 399/12, 27, 111, 24, 29, 30, 81; 346/160, 346/1.1, 75

See application file for complete search history.

(56) References Cited

U.S. PATENT DOCUMENTS

| | | | |
|---|---|---|---|
| 4,413,264 A | | 11/1983 | Cruz-Uribe et al. |
| 4,967,181 A | * | 10/1990 | Iizuka et al. ............. 340/450.2 |
| 5,066,978 A | | 11/1991 | Watarai et al. |
| 5,204,698 A | | 4/1993 | LeSueur et al. |
| 5,335,048 A | | 8/1994 | Takano et al. |
| 5,349,377 A | | 9/1994 | Gilliland et al. |
| 5,365,312 A | | 11/1994 | Hillmann et al. |
| 5,459,556 A | * | 10/1995 | Acquaviva et al. ......... 355/209 |
| 5,465,619 A | * | 11/1995 | Sotack et al. ................ 73/304 |
| 5,517,282 A | | 5/1996 | Yamashita et al. |

(Continued)

FOREIGN PATENT DOCUMENTS

| | | |
|---|---|---|
| EP | 0587172 | 3/1994 |
| EP | 0685768 | 12/1995 |
| EP | 0945781 | 9/1999 |
| JP | 1115649 | 5/1989 |
| JP | 6138769 | 3/1994 |
| JP | 9185239 | 7/1997 |
| JP | 10006553 | 1/1998 |
| JP | 10202951 | 8/1998 |
| JP | 10239978 | 9/1998 |
| JP | 10239980 | 9/1998 |
| JP | 11309878 | 9/1999 |
| JP | 11352846 | 12/1999 |

OTHER PUBLICATIONS

CBS Systems, Inc., "Hitachi Products: Model DDS 40", [online], [Retrieved on Apr. 23, 2001]. Retrieved from the Internet at <URL: http://www.cbsdigital.com/Hitachi/Products.asp?P=DDS40&C=V>.

(Continued)

*Primary Examiner*—Jeffery Hofsass
*Assistant Examiner*—Hung Nguyen
(74) *Attorney, Agent, or Firm*—David W. Victor; Konrad Raynes & Victor LLP

(57) ABSTRACT

Provided is a method, system, and program for monitoring depletion of a consumable resource in a monitored system. Information is received on at least one unit of work to be processed by the monitored system, wherein the monitored system would deplete the consumable resource when processing each unit of work. A determination is made of a rate of resource depletion per unit of work processed. An amount of resource remaining after the monitored system processes the at least one unit of work is estimated as a function of the determined rate of resource depletion and a number of one or more units of work to process. A graphical display for rendering on a computer monitor is generated indicating the estimated amount of the resource remaining.

60 Claims, 7 Drawing Sheets

U.S. PATENT DOCUMENTS

| | | | |
|---|---|---|---|
| 5,592,298 A | | 1/1997 | Caruso |
| 5,682,140 A | * | 10/1997 | Christensen et al. ........ 340/540 |
| 5,717,974 A | | 2/1998 | Park |
| 5,797,061 A | * | 8/1998 | Overall et al. ................ 399/27 |
| 5,802,420 A | * | 9/1998 | Garr et al. .................... 399/27 |
| 5,850,583 A | | 12/1998 | Song et al. |
| 5,937,149 A | * | 8/1999 | Lindner et al. ............. 395/113 |
| 5,937,225 A | | 8/1999 | Samuels |
| 6,011,937 A | | 1/2000 | Chaussade et al. |
| 6,223,131 B1 | * | 4/2001 | Kanaya et al. ................ 702/55 |

OTHER PUBLICATIONS

Commonwealth Copiers, "Products and Solutions: Dataproducts Typhoon 40", [online], [Retrieved on Apr. 23, 2001]. Retrieved from the Internet at <URL: http://www.commonwealthdigital.com/products/np/dtyph40.htm>.

Gleidman, J., "Hitachi Koki DDS 32", *PC Magazine*, [online], [Retrieved on Apr. 23, 2001]. Retrieved from the Internet at <URL: http://www.zdnet.com/pcmag/stories/firstlooks/0,6763,402318,00.html>.

HANSONDATA.COM, "Dataproducts Typhoon 60 MDX00 Production Laser Printer", [online], [Retrieved on Apr. 23, 2001]. Retrieved from the Internet at <URL: http://www.hansondata.com/ty6mspe.htrm>.

Harbaugh, L., "Painless Printer Management", *Information Week Online*, [online], Apr. 13, 1998, [Retrieved on Apr. 23, 2001]. Retrieved from the Internet at <URL: http://www.informationweek.com/677/77olppm.htm>.

Karney, J., "Dataproducts Corp.: Typhoon 40", *PC Magazine*, [online], Jun. 11, 1996, [Retrieved on Apr. 23, 2001]. Retrieved from the Internet at <URL://www.zdnet.com/pcmag/issues/1511/pcmg0073.htm>.

LEXMARK, "Products and Supplies", © 2000 Lexmark International, Inc., [Retrieved on Apr. 23, 2001].Retrieved from the Internet at <http:www.lexmark.com/canada/networking/software.html>.

Meritech, "DataProducts Printwatch Network Printer Management Software", [online], © 1998 Meritech Office Technologies, [Retrieved on Apr. 23, 2001]. Retrieved from the Internet at <URL:http://www.meritechinc.com/dataproducts_printwatch.html>.

PR Newswire, "Dataproducts Announces Printwatch Network Printer Management Software for Typhoon Laser Printers",Sep. 25, 1995.

* cited by examiner

| Toner Type | Grams Toner Depleted per Sq. Inch Print Coverage | Pages printed per gram of toner | Adjustment Factor |
|---|---|---|---|
| Black Polyester | | | |
| Black MICR | | | |
| Cyan | | | |
| | | | |

Toner Depletion Rate Table

52

| Contrast Level | Contrast Factor |
|---|---|
| 1 | 0.85 |
| 2 | 0.9 |
| 3 | 1.0 |
| 4 | 1.08 |
| 5 | 1.12 |

Contrast Table

54

| Boldness Level | Boldness Factor |
|---|---|
| 1 | 0.8 |
| 2 | 0.9 |
| 3 | 1.0 |
| 4 | 1.1 |
| 5 | 1.15 |

Boldness Table

METHOD, SYSTEM, AND PROGRAM FOR MONITORING A CONSUMABLE RESOURCE USED BY A SYSTEM

BACKGROUND OF THE INVENTION

1. Field of the Invention

The present invention relates to a method, system, and program for monitoring a consumable resource used by a system.

2. Description of the Related Art

Many printers today provide some alert when certain printer resources are close to becoming depleted or have been depleted. For instance, printers typically include a small Liquid Crystal Display (LCD) screen to display a message that toner is low, paper is out, etc. Further many printer vendors include with the printer driver a program that displays at a computer connected to the printer messages alerting users that paper is out, toner is low, fuser oil is low, etc. To implement such alert systems, sensors are used to detect when a resource is depleted. For instance, the paper tray would include an electrical or electromechanical sensor to detect when the paper tray is empty. A toner and oil cartridge would include sensors to detect when the toner level is near or at empty. The sensor, upon detecting that the resource is close to or at depletion, would signal the printer processor and the printer processor would, in response, send an alert message to an LCD screen at the printer or to a printer management software program running on an attached computer.

The above described prior art provides status information at a point when the resource is near or at depletion level. Notwithstanding, there is a need in the art to provide additional status information on the consumption of printer resources, such as paper, toner, oil, etc., before the resource reaches depletion level to allow for more active monitoring and maintenance of printers.

SUMMARY OF THE PREFERRED EMBODIMENTS

Provided is a method, system, and program for monitoring depletion of a consumable resource in a monitored system. Information is received on at least one unit of work to be processed by the monitored system, wherein the monitored system would deplete the consumable resource when processing each unit of work. A determination is made of a rate of resource depletion per unit of work processed. An amount of resource remaining after the monitored system processes the at least one unit of work is estimated as a function of the determined rate of resource depletion and a number of one or more units of work to process. A graphical display for rendering on a computer monitor is generated indicating the estimated amount of the resource remaining.

In further implementations, the graphical display comprises a graphical gauge displaying a range of values from zero to a maximum capacity of the consumable resource in the monitored system, wherein the estimated amount of the resource remaining is indicated on the gauge.

Yet further, notification is received that the consumable resource is depleted in the monitored system. A determination is made of an adjustment factor if the estimated amount of resource remaining is not estimated to be depleted. The adjustment factor is applied when estimating the amount of resource remaining during use of the monitored system after the consumable resource is replenished in the monitored system.

Still further, multiple systems may be monitored. In such case, the estimated amount of resource remaining is determined for each monitored system. At least one graphical element is displayed on the computer monitor for each monitored system indicating the estimated amount of the resource remaining for the monitored system.

Further provided is a method, system, and program for monitoring depletion of a consumable resource in a printer. A print job is received having print matter for at least one page. A determination is made of a rate of resource depletion per page. An estimation is made of an amount of resource remaining after the printer processes the print job as a function of a number of the at least one page in the print job and the determined rate of resource depletion. A graphical element is generated for display on a computer monitor indicating the estimated amount of the resource remaining.

In further implementations, a data structure is provided indicating rates of resource depletion for different printers. A determination is made of an identifier of the printer to print the print job. In such case, determining the rate of resource depletion comprises determining the rate of resource depletion in the data structure corresponding to the determined identifier of the printer.

The described implementations provide techniques for estimating an amount of depletion of a consumable resource used by a system when performing a unit of work, such as an amount of toner depleted by a printer when printing pages. The described implementations further display information enabling the user or system administrator to monitor the estimated amount of the resource remaining and take appropriate action to replenish the resource if necessary.

BRIEF DESCRIPTION OF THE DRAWINGS

Referring now to the drawings in which like reference numbers represent corresponding parts throughout:

FIG. 3 illustrates tables used in estimating the toner remaining at a printer in accordance with implementations of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
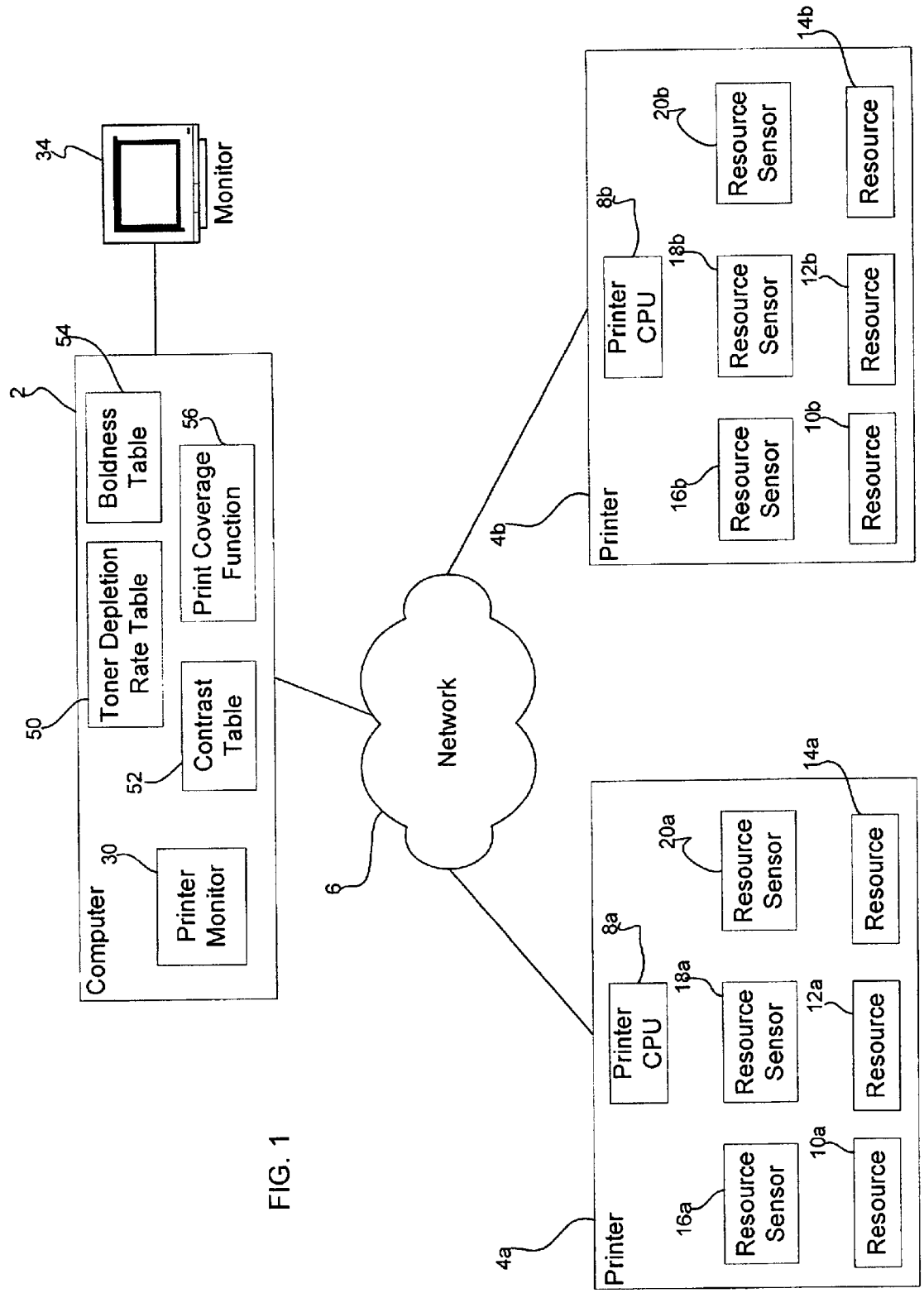
FIG. 1 is an illustration of a printing environment in which aspects of the invention are implemented.

FIG. 1 illustrates a printer environment in which aspects of the invention are implemented. A computer 2 is in communication with printers 4a and 4b over a network 6. The computer 2 may comprise any computing system known in the art, such as a personal computer, laptop, palm top, telephony device, desktop system, mainframe, etc. The network 6 may comprise any computer network known in the art, including a Local Area Network (LAN), Wide Area Network (WAN), Ethernet, the Internet, etc. The printers 4a and 4b may comprise any type of printer known in the art. Alternatively, the computer 2 may have a direct connection to the printers 4a and 4b through any type of interface known in the art, such as a network interface, parallel interface, serial interface, Universal Serial Bus (USB) or any other port type known in the art. Each of the printers 4a and 4b include a printer central processing unit (CPU) 8a and 8b and a plurality of resources 10a, 12a, 14a and 10b, 12b, and 14b. The resources may comprise any type of resource consumed by the printer 4a, 4b, such as paper, toner, fuser oil, etc. For each of the resources 10a, 10b, 12a, 12b, 14a, 14b there is a resource sensor 16a, 16b, 18a, 18b, 20a, 20b that detects when the resource is approximately depleted. For paper resources, the resource sensor would comprise an electromechanical sensor that detects when there is no paper in the input tray. For toner and fuser oil, the sensor may comprise an electrical sensor in the toner and fuser oil cartridge that detects when the level of toner and fuser oil falls to a depletion level. The toner and fuser oil cartridge may be a disposable or permanent.

Figure 2:
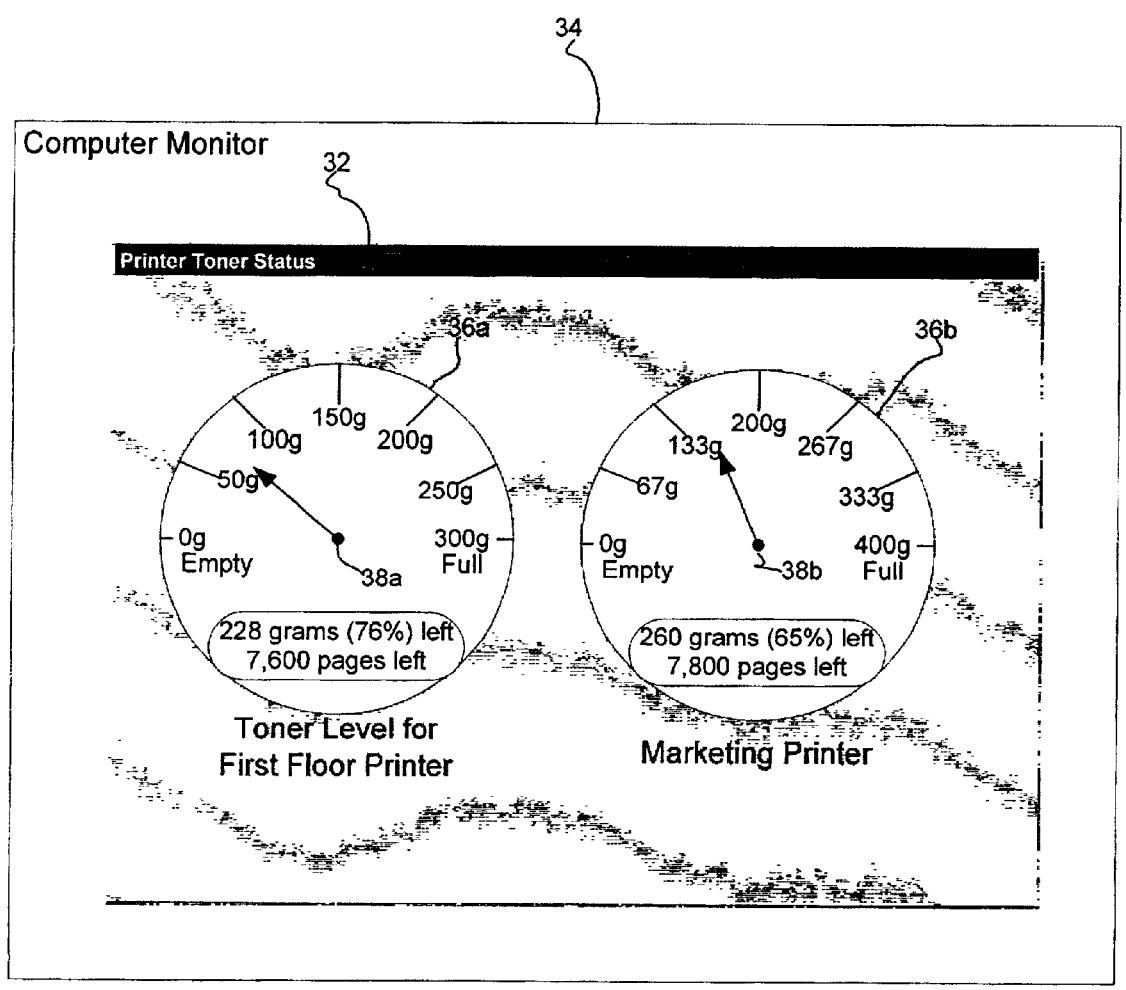
FIG. 2 illustrates an example of a display of the estimated toner remaining at monitored printers in accordance with implementations of the present invention.

The computer 2 includes a printer monitor program 30 that generates information through a graphical user interface (GUI) on the amount remaining for resources 10a, 10b, 12a, 12b, 14a, 14b in the printers 4a, 4b. FIG. 2 illustrates a printer status window 32 displayed within a monitor 34 (FIGS. 1 and 2) attached to the computer 2 that is generated by the printer monitor program 30. In the printer status window 32, the printer monitor 30 displays a toner status gauge 36a and 36b for each printer 4a and 4b, respectively, that the printer monitor 30 monitors over the network 6. In FIG. 2, the printers 4a and 4b are shown as named "First Floor Printer" and "Marketing Printer", which describes where in the facility the printers 4a and 4b are located. The toner status gauges 36a and 36b are displayed with a needle 38a and 38b that can extend from 0 grams to the capacity of the toner cartridge, which in the case of the toner cartridge in printer 4a is 300 grams and for printer 4b is 400 g. While the printers 4a and 4b are operating, the gauges 36a and 36b display an estimate of the amount of toner, or other monitored resource, remaining.

To determine the current status of toner and display the gauges 36a and 36b, the printer monitor 30 maintains the following tables and information to use in estimating the amount of toner resource that is consumed:

Toner Depletion Rate Table 50: The toner depletion rate table 50 provides a toner depletion rate for different types of toner. For instance, the rate of usage is different for polyester and MICR toners, and is different for different color toners. The rate of usage is expressed in terms of grams of toner used per square inch of print coverage per page. The print coverage is the area of the page that is covered with toner, as opposed to white space. The toner depletion rate table 50 further includes the number of pages printed per gram of toner for each toner type. This rate can be used to estimate the number of pages that can be printed with the estimated remaining toner. Also included is an adjustment factor for each toner type that provides an adjustment per gram of toner and is used during calculations to estimate the toner depletion. This adjustment factor (adj_factor) is initialized to zero. Both the pages printed per gram of toner (pages_per_gram) and adjustment factor (adj_factor) can be modified during printer operations as described with respect to FIGS. 4, 5, and 6 to provide a more accurate estimate of these values in the toner depletion rate table 50. FIG. 3 illustrates an example of a toner depletion table 50.

Contrast Table 52: For each user selected contrast level in a printer type, the contrast table provides a contrast factor that is used to adjust the estimate of the amount of toner printed on the page. The contrast describes the optical density, which is the degree of contrast or darkness at a certain coverage. At an average or normal contrast level, the contrast factor is one. If the user selected contrast is above a normal level, then the contrast factor is some predetermined value greater than one; if less than the normal level, the contrast factor is some predetermined value less than one. FIG. 3 illustrates an example of a contrast table 52 providing different contrast factors for different user selected contrast levels and printers. Alternatively, there may be separate contrast 52 and boldness 54 tables for each printer type.

Boldness Table 54: The user can select the thickness or boldness of the fonts and lines on a page. Boldness is also known as dot gain, which is the degree of over-boldness for a certain dot or pel. The boldness table 54 provides for each user selected boldness level and a boldness factor that is used to adjust the amount of toner printed on the page. At an average or normal boldness level, the boldness factor is one. If the user selected boldness level is above a normal level, then the boldness factor is some predetermined value greater than one; if less than the normal level, the boldness factor is some predetermined value less than one. FIG. 3 illustrates an example of a boldness table 50 providing different boldness factors for different user selected boldness levels.

Print Coverage Function 56: This function provides an amount of print coverage, i.e., the percentage area of the page covered with toner, given the compression level, size of the compressed file, and number of pages in the print job as input parameters. Three input factors that affect the print coverage per page include the number of pages, the compression ratio and the print file size. The fewer the number of pages, the greater the print coverage per page, i.e., square inches of printed matter on the page, because the data provides print output for fewer pages. The higher the compression ratio, the greater amount of uncompressed printed matter there is and higher the print coverage because more uncompressed print data is included in the file. The larger the file size, the more print data included in the file and, thus, the greater the print coverage for the pages in the print job. The print coverage function 56 for a particular toner and printer can be calculated applying numerical analysis to empirical data gathered by observing the print coverage resulting from print files having different numbers of pages, compression ratios, and file size. In the described implementations, a print coverage function 56 is provided for each toner type for which information is maintained, such as for the toner types listed in the toner depletion rate table 50, and for each printer type.

Figure 4:
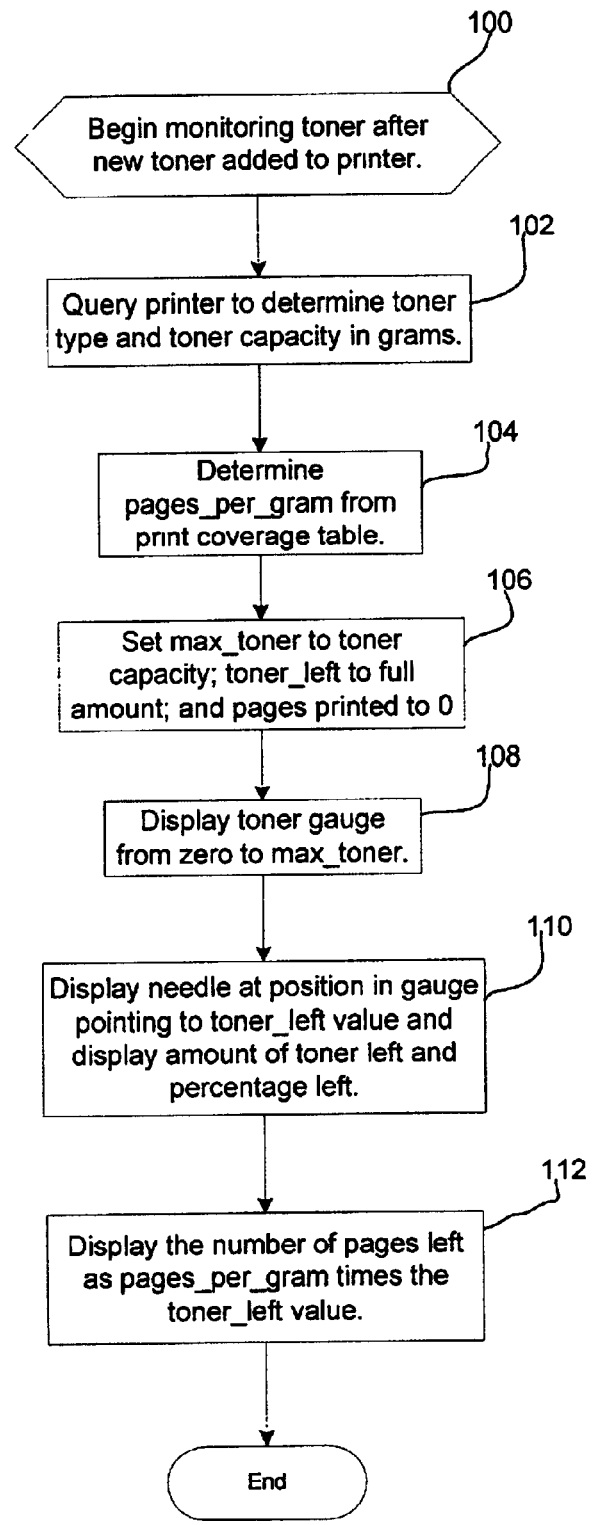
FIGS. 4, 5, and 6 illustrate logic to estimate toner remaining at a printer in accordance with implementations of the present invention.
Figure 5:
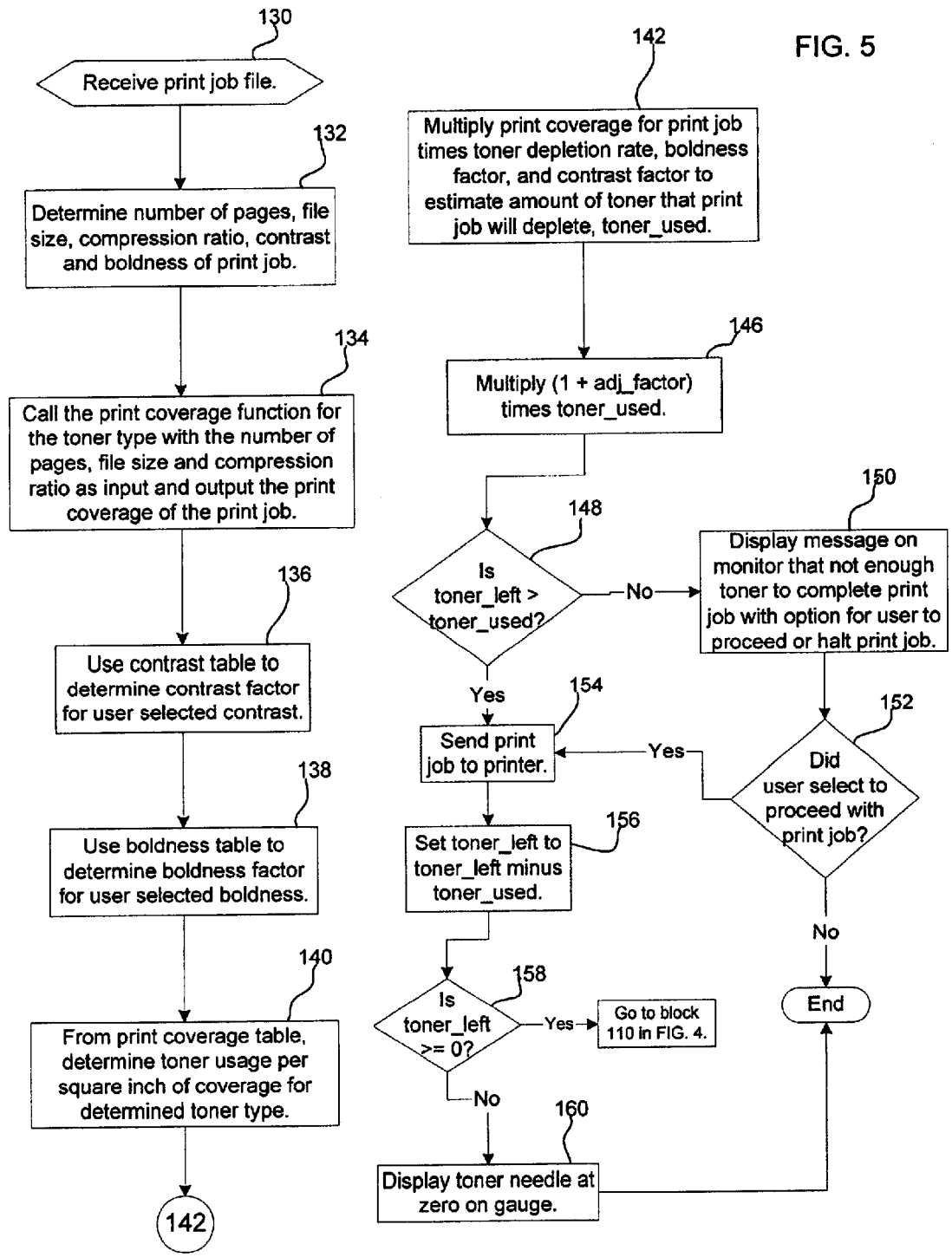
Figure 6:
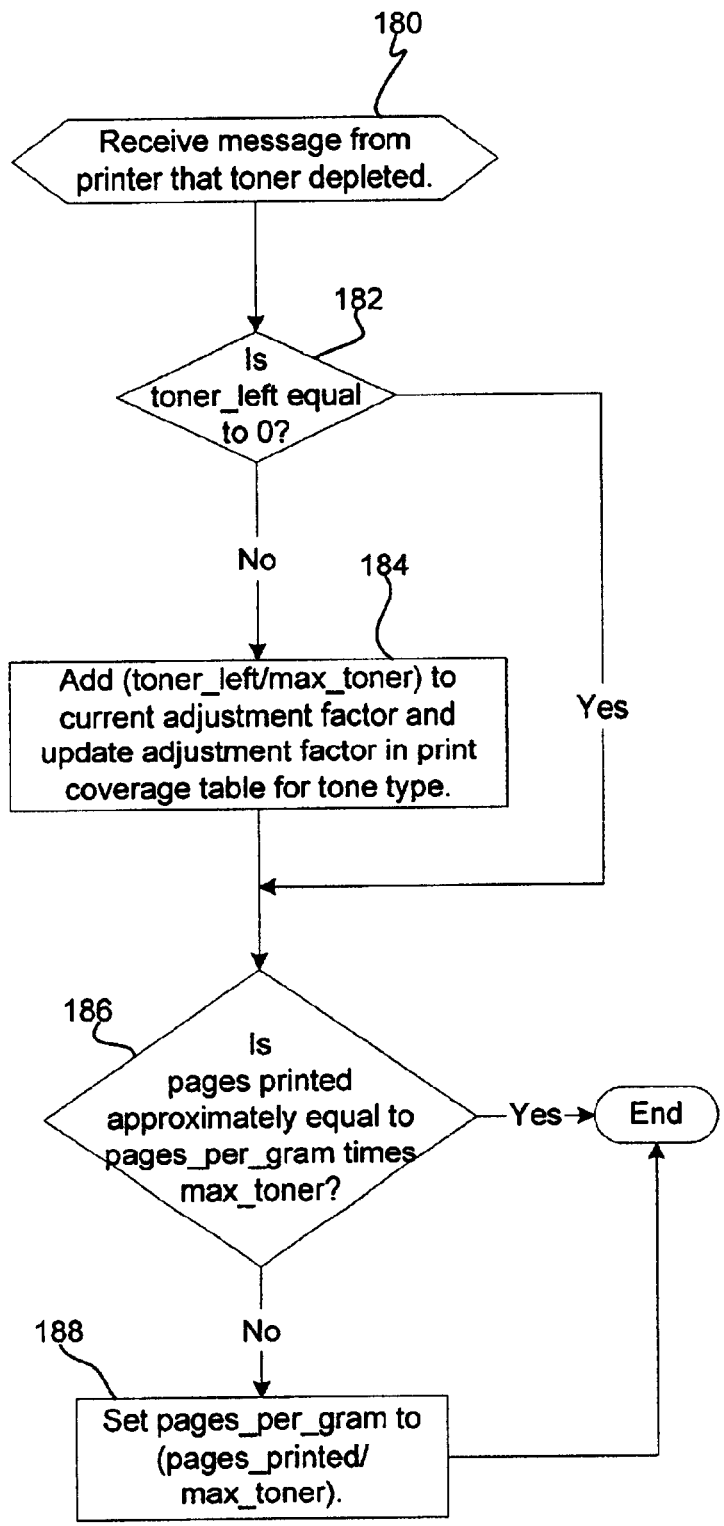

FIGS. 4, 5, and 6 illustrates logic implemented in the printer monitor 30 to estimate the amount of printer toner available and display information on the amount of available toner as shown in FIG. 2. The logic of FIGS. 4, 5, and 6 uses the following variables:

pages_per_gram: estimate of the number of printed pages per gram of toner for the printer 4a, 4b. This value is maintained for a particular toner type in the toner depletion rate table 50.

max_toner: provides the full capacity in grams of the toner cartridge being monitored.

toner_left: provides an estimate of the amount of toner left in the cartridge using the logic of FIGS. 4, 5, and 6.

adj_factor: used to adjust the estimate of the amount of toner left. This value is maintained in the toner depletion rate table 50 for the different toner types.

pages_printed: Number of pages printed during the use of the current toner cartridge.

With respect to FIG. 4, control begins at block 100 with the printer monitor 30 beginning to monitor the toner level at a printer 4a, 4b when a new toner is added to the printer 4a, 4b. The printer 4a, 4b is queried (at block 102) to determine the toner type and the amount of grams of toner when the cartridge is full. The estimate of the pages printed per gram (pages_per_gram) is determined (at block 104) from the toner depletion rate table 50 for the determined toner type, i.e., in the row of the determined toner type. The printer monitor 30 initializes (at block 106): the maximum toner variable (max_toner) to the determined amount of toner when the cartridge is full; the amount of toner left variable (toner_left) to the maximum toner (max_toner); and the pages_printed variable to zero. The printer monitor 30 then generates (at block 108) information to display a toner gauge on the computer monitor 34 extending from 0 to the maximum toner (max_toner), such as the gauges 36a and 36b shown in FIG. 2. A needle, e.g., needle 38a and 38b (FIG. 2), is displayed (at block 110) in the gauge pointer to the toner_left_value, which initially is the maximum toner. Also displayed (at block 112) in the gauge is the estimated pages left that can be printed with the estimated amount of toner remaining in the cartridge, which is the estimated pages per gram (pages_per_gram) times the amount of toner left (toner_left).

With respect to FIG. 5, a print job file having data for one or more printed pages is received (at block 130) at the computer 2. If the computer 2 functions as a printer server, then the print job file may be transmitted from another system for queuing and spooling at the computer 2. Alternatively, if the computer 2 is a stand alone system, then the print job file may be generated from an application executing within the computer 2. The printer monitor 30 determines (at block 132) the number of pages in the print job, the compression ratio, file size, contrast, and boldness of the print job. Such information may be maintained with information included within the print job file. For instance, the print job file may be included within a framework that provides information on the characteristics of the printer and the printer job, such as the IBM Intelligent Printer Data Stream (IPDS) framework, the Adobe Corporation Document Structuring Convention for PostScript, etc. The printer monitor 30 then calls (at block 134) the print coverage function 56 for the particular toner type and printer with the number of pages, file size of print job and compression ratio of the received file. In response to the call, the print coverage function 56 returns the print coverage or number of square inches of printed matter for the entire print job, which may comprise one or more pages of output. The contrast table 52 is then accessed to determine (at block 136) the contrast factor corresponding to the contrast level set by the user and the boldness table 54 is accessed to determine (at bock 138) the boldness factor corresponding to the boldness level set by the user for the print job. From the toner depletion rate table 50, the depletion rate per square inch of print coverage is determined (at block 140).

After gathering all the information needed, the printer monitor 30 multiplies (at block 142) the determined print coverage times the determined toner depletion rate for the toner type, then multiplies this value times the boldness factor and contrast factor. The result of this multiplication, which provides an estimate of the amount of toner depleted for the print coverage, is then multiplied (at block 146) times one plus the adjustment factor for the toner type to produce the final estimate of the amount of toner that will be depleted (toner_used) for the print job. The adjustment factor may be negative or positive. If (at block 148) the toner remaining (toner_left) is less than the estimated toner needed for the print job, i.e., there is not enough toner estimated to be left for the print job, then the printer monitor 30 displays (at block 150) a message on the monitor 34 that there is not enough toner remaining for the print job and prompts the user to select whether to cancel or proceed with the print job. If (at block 152) the user selects to proceeds with the job or if (from the YES branch of block 148) enough toner is estimated to remain for the print job, then the print job is rasterized and sent (at block 154) to the printer 4a, 4b for rendering. The remaining toner variable (toner_left) is then set (at block 156) to the current toner_left minus the estimated toner used for the print job (toner_used). If (at block 158) the estimated toner remaining (toner_left) is greater than or equal to zero, then control proceeds back to block 110 in FIG. 4 to display the needle 38a and 38b (FIG. 2) at the remaining toner (toner_left) value of the gauge 36a and 36b for the target printer. If the estimated toner is less than zero, then the needle on the toner gauge is displayed (at block 160) at zero. In certain of the implementations, the estimated remaining toner (toner_left) may be less than zero if the printer monitor 30 overestimates the amount of toner used.

In steps 148–154 in FIG. 5, the printer monitor 30 used the estimate of remaining toner to decide whether to allow a print job to proceed. In alternative implementations, the printer monitor 30 may only be used to estimate the remaining resource level and display the gauges, and not determine whether sufficient resources remain to allow a print job to proceed.

FIG. 6 illustrates logic implemented in the printer monitor 30 to respond (at block 180) to a notification from the printer 4a, 4b that the toner resource has depleted. As discussed, the toner cartridge resource may include a sensor that sends a message to the printer CPU 8a, 8b when the toner reaches a depletion level in the cartridge in a manner known in the art. The printer CPU 8a, 8b would then communicate the message to the printer monitor 30. When receiving the depletion signal, if (at block 182) the estimated remaining toner (toner_left) is not approximately empty, then the printer monitor 30 has over or underestimated the depletion of toner at the printer 4a, 4b. The approximate empty value may include a margin of error, such that over or under estimating by a few grams is accepted. In such case, the printer monitor 30 (at block 184) divides the estimated remaining toner (toner_left) by the full toner capacity (max_toner) to determine percentage of under or over estimation made for that cartridge. This over/under estimate percent, which is some value between negative one and positive one is added to the current adjustment factor (adj_factor) maintained in the toner depletion rate table 50 for the toner type to update the adjustment factor (adj_factor) for future uses of the toner type for the specific printer 4a, 4b.

Moreover, if (at block 186) the pages printed (pages_printed) is approximately equal (within an acceptable level of error) to the pages per gram estimate times the full capacity (max_toner), then no adjustment of the pages printed per gram is needed. Otherwise, the pages_per_gram is set (at block 188) to the actual number of printed pages (pages_printed) divided by the total number of grams (max_toner) when capacity is full.

In the described implementations, the printer monitor 30 may maintain the tables 50, 52, 54, and 56 for each different printer 4a, 4b being monitored or for a specific type of printer. In certain implementations, the adjustment factor (adj_factor) and pages_per_gram are maintained on a printer-by-printer basis because each printer, even printers of the same type, may have different capabilities due to their environment, age, etc.

In color printer implementations, there are multiple toner cartridges used for a print job. In such case, the tables 50, 52, and 54 would maintain information for each color toner (Cyan (C), Magenta (M), Yellow (Y), and black (K)) used in the printer. Further, the steps in FIGS. 4, 5, and 6 would be performed with respect to each toner cartridge in the printer, with the exception of block 134 in FIG. 5 where the print coverage is determined. To determine the print coverage for a color toner, the full print coverage for the print job is determined as described above, with the exception that the print job is processed to determine the percentage of the actual particular color in the print job for the entire print job. This determined percentage is then multiplied by the print coverage for the full coverage to obtain the print coverage for the particular color toner, which is then used throughout the remaining steps following block 134 to estimate the amount of toner that has been used.

Figure 7:
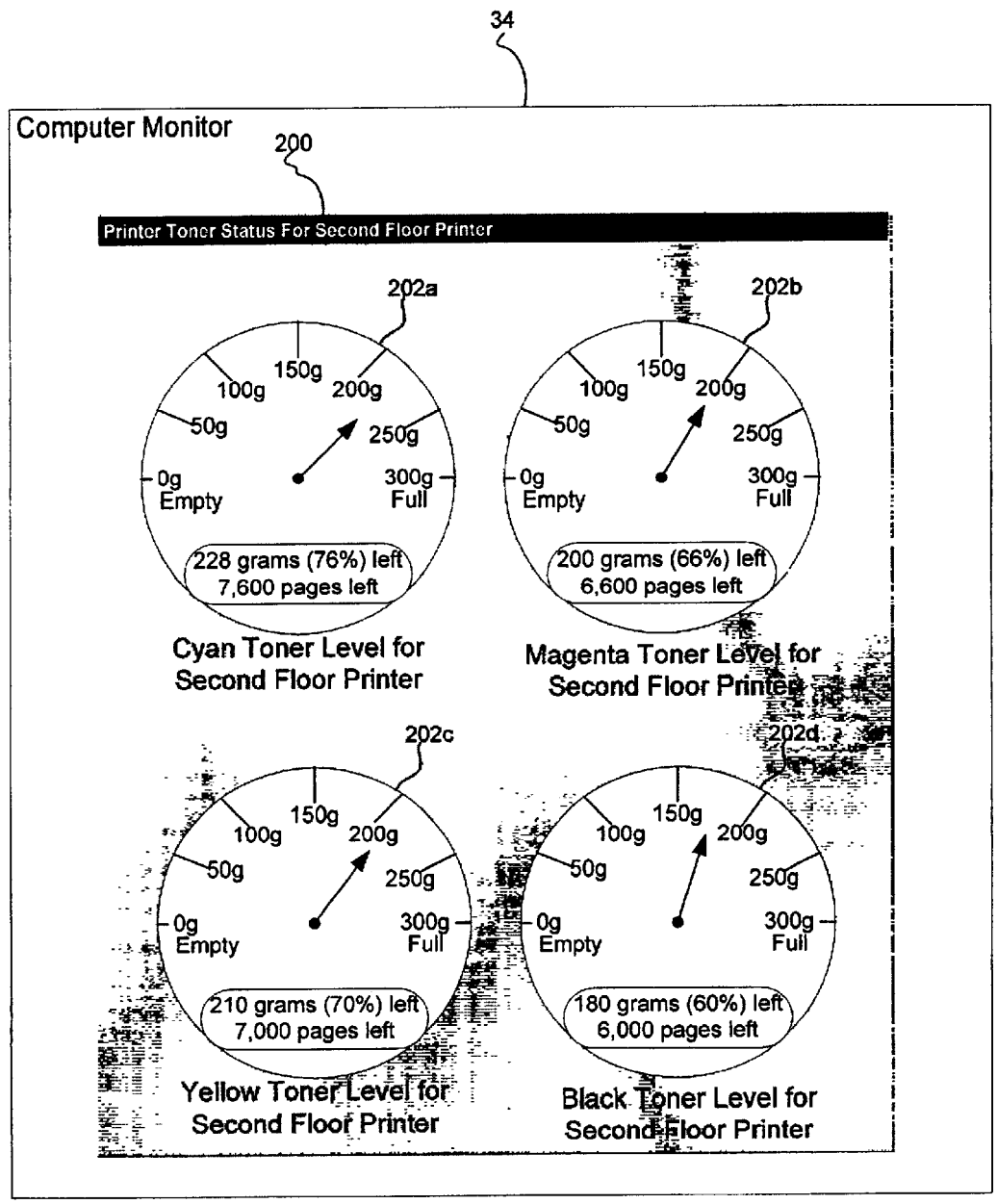
FIG. 7 illustrates an example of a display of estimated toner remaining for color toner cartridges in a color printer in accordance with implementations of the present invention.

FIG. 7 illustrates a display 202a, 202b, 202c, 202d displaying the remaining amount of toner for each CMYK color in the color printer.

The printer monitor 30 may also estimate the amount of fuser oil consumed and display a gauge, similar to the gauges shown in FIG. 2, showing the amount in grams of toner oil remaining. The fuser comprises the pair of rollers through which the paper on which toner is deposited passes through to "fuse" the toner into place on the paper. Fuser oil comprises a special temperature resistant oil that is applied to the fuser rollers to prevent toner from adhering to the rollers. On production printers and large workgroup printers, the fuser oil may be supplied separately to the printer and poured into a small tank in the printer. Smaller printers normally incorporate the fuser oil into the fuser cleaning pad. To estimate the fuser oil usage, the printer monitor 30 would need only one table for each printer that provides the amount of fuser oil consumed per printed page for different print models. In this way, after processing a print job comprised of one or more pages, the printer monitor 30 can estimate the amount of fuser oil remaining by subtracting an estimated amount of fuser oil used for the print job. Further, just as boldness and contrast operator settings were used to provide a more accurate estimation of toner depletion, operator settings may be used in the estimation of fuser oil usage. The printer monitor 30 may provide factors for the different media types that may be used in the print job, and adjust the estimation of oil used based on the media type in the print job. Further, the printer monitor 30 may consider an operator selection of fuser oil rate (such as 1 to 100, or low/medium/high) to control the amount of oil used.

Additionally, an adjustment factor may be maintained for each printer that is applied to the estimated amount of fuser oil used. After the printer monitor 30 is notified by the printer 4a, 4b that the fuser oil tank is empty, the printer monitor 30 would generate a fuser oil adjustment factor based on the current estimated fuser oil remaining when the message that the fuser oil tank is empty is received. This fuser oil adjustment factor would be applied to each estimate and may be adjusted each time the fuser oil tank is emptied.

The described implementations provide a technique for continually monitoring the current resource level in a system using software. By using software estimation techniques to monitor resource usage, the described implementations provide monitoring without the need for additional hardware, such as multiple sensors to monitor a resource level. For instance, one could design a print cartridge to include multiple sensors to detect the remaining amount of resource at various levels, such as different points in a cartridge or reservoir. However, including additional hardware sensors in the cartridge or at the device, which in the case of a cartridge may be disposable, can increase the costs of the system. The described implementations provide continual monitoring of the resource without the need for additional monitoring hardware, such as multiple sensors.

With the described implementations, the printer monitor 30 may use both operator settings (contrast, boldness, oil rate, media type, etc.) and unique parameters (accounted for with the adjustment factor) inside the printer to estimate the resource depletion. Further, the use of the adjustment factor allows the algorithm to adapt to printer specific factors, such as the environment, age or misadjustments of the printer, in order to provide for greater accuracy in the estimation of resource levels and the information displayed in the gauge.

Customers may use the information displayed in the gauge of current resource levels to plan the purchase, storage, and allocation of resources necessary for printer operations. For instance, a customer that prints phone bills 24 hours a day can use the information on current resource levels provided in the gauges to more efficiently manage the purchase and stocking of the resource, and avoid inefficient purchasing decisions and use of storage supply space.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

In the described implementations, consumable printer resources were monitored. However, in alternative implementations, the technique for monitoring consumable resources and displaying a graphical gauge may apply to any type of device attached to a processing device that is capable of being notified when a resource is depleted and has access to information on resource depletion rates. For instance, monitoring system described herein be used to monitor resource depletion in facsimile machines, copiers, and any other device that consumes a replaceable resource.

In described implementations for monitoring the level of a resource in a reservoir or cartridge, only one sensor was included in the cartridge at the depletion level. Further implementations may include additional sensors to detect resource levels prior to depletion in order to provide for more frequent calibration of the data used to estimate the resource level, such as the adjustment factor.

The GUI panels shown in FIGS. 2 and 7 are for illustrative purposes. Graphical design elements and GUI functions may be added and removed without departing from the invention. Further, gauges for different resources and/or different printers being monitored may be concurrently displayed The monitored printers may comprise any type of printer device known in the art, such as a laser printer, thermal printer, dot matrix printer, ink jet, line printer, LCD or LED printer, daisy wheel, or any other type of printer device known in the art. In such case, the printer would activate the electronic or electro-mechanical components within the printer in response to the one or more notification messages.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

**IBM is a registered trademark of International Business Machines Corporation and Adobe and PostScript are trademarks of Adobe.

What is claimed is:

1. A method for monitoring depletion of a consumable resource in a monitored system, comprising:
   receiving information on at least one unit of work to be processed by the monitored system, wherein the monitored system would deplete the consumable resource when processing each unit of work;
   determining a rate of resource depletion per unit of work processed;
   estimating an amount of resource remaining after the monitored system processes the at least one unit of work, wherein the estimate is a function of the determined rate of resource depletion and a number of the one or more units of work remaining to be processed, wherein estimating the amount of resource remaining comprises:
   (i) multiplying a number of one or more units of work to process times the rate of resource depletion to estimate an amount of resource depletion that results from processing the at least one unit of work; and
   (ii) setting the estimated amount of resource remaining to the estimated amount of resource remaining minus the estimated amount of resource depletion; and
   generating a graphical element for display on a computer monitor indicating the estimated amount of the resource remaining.

2. The method of claim 1, wherein the graphical display comprises a graphical gauge displaying a range of values from zero to a maximum capacity of the consumable resource in the monitored system, wherein the estimated amount of the resource remaining is indicated on the gauge.

3. The method of claim 2, wherein indicating the estimated amount of the resource remaining on the gauge comprises displaying a graphical needle on the gauge pointing to a position on the gauge indicating the estimated amount of the resource remaining.

4. The method of claim 1, further comprising:
   estimating a number of units of work that can be processed with the estimated amount of the resource remaining; and
   generating information to display with the generated graphical element indicating the estimated number of units of work.

5. The method of claim 1, further comprising:
   receiving notification that the consumable resource is depleted in the monitored system; and
   determining an adjustment factor if the estimated amount of resource remaining is not estimated to be depleted, wherein the adjustment factor is applied when estimating the amount of resource remaining during use of the monitored system after the consumable resource is replenished in the monitored system.

6. The method of claim 1, further comprising:
   after the consumable resource is fully replenished, initializing the estimated amount of resource remaining to full capacity.

7. The method of claim 1, further comprising:
   determining whether the estimated amount of the resource remaining indicates that the consumable resource is depleted in the monitored system; and
   generating a message indicating that there is not a sufficient amount of resource remaining to process the at least one unit of work if the resource is determined to be depleted in the monitored system.

8. The method of claim 1, wherein multiple systems are monitored, wherein the estimated amount of resource remaining is determined for each monitored system, and at least one graphical element is displayed on the computer monitor for each monitored system indicating the estimated amount of the resource remaining for the monitored system.

9. A method for monitoring depletion of a consumable resource in a printer, comprising:
   receiving a print job having print matter for at least one page;
   determining a rate of resource depletion per page;
   estimating an amount of resource remaining after the printer processes the print job as a function of a number of the at least one page in the print job and the determined rate of resource depletion, wherein estimating the amount of resource remaining comprises:
   (i) multiplying a number of pages in the print job times the determined rate of resource depletion to estimate an amount of resource depletion at the printer when processing the print job; and (ii) setting the estimated amount of resource remaining to the estimated amount of resource remaining minus the estimated amount of resource depletion; and generating a graphical element for display on a computer monitor indicating the estimated amount of the resource remaining.

10. The method of claim 9, further comprising:

providing a data structure indicating one rate of resource depletion for different printers; and determining an identifier of the printer to print the print job, wherein determining the rate of resource depletion comprises determining the rate of resource depletion in the data structure corresponding to the determined identifier of the printer.

11. The method of claim 10, wherein the identifier of the printer comprises one of a printer model and a unique name of the printer that will process the print job.

12. The method of claim 10, wherein the data structure provides rate of resource depletions for different material compositions used for the consumable resource, wherein determining the rate of resource depletion further comprises:

determining a material composition of the consumable resource in the printer; and determining the rate of resource depletion in the data structure for the determined material composition.

13. The method of claim 9, further comprising:

receiving notification from the printer that the consumable resource is depleted in the monitored printer; and determining an adjustment factor if the estimated amount of resource remaining is not estimated to be depleted, wherein the adjustment factor is applied when estimating the amount of resource remaining during use of the monitored printer after the consumable resource is replenished in the printer.

14. The method of claim 9, further comprising:

after the consumable resource is fully replenished, initializing the amount of resource remaining to full capacity.

15. The method of claim 9, further comprising:

determining whether the estimated amount of the resource remaining indicates that the consumable resource is depleted in the monitored printer; and generating a message indicating that there is not a sufficient amount of the resource remaining to process the number of pages in the print job if the resource is determined to be depleted in the monitored system.

16. The method of claim 9, further comprising:

determining at least one attribute of the print job; and determining one attribute factor for each determined attribute of the print job, wherein the determined at least one attribute factor is used to estimate the amount of the resource remaining.

17. The method of claim 16, wherein the consumable resource comprises toner and wherein the determined attributes of the print job include contrast and boldness.

18. The method of claim 17, further comprising:

providing a contrast table and boldness table providing different contrast and boldness factors, respectively, for different contrast and boldness settings.

19. The method of claim 9, wherein the graphical display comprises a graphical gauge displaying a range of values from zero to a maximum capacity of the consumable resource in the monitored system, wherein the estimated amount of the consumable resource remaining is indicated on the gauge.

20. The method of claim 19, wherein the printer is a color printer, and wherein resource depletion is monitored for multiple color toners used in the monitored printer, wherein one gauge is displayed for each color toner in the printer.

21. The method of claim 19, wherein the consumable resource is monitored at multiple printers and the amount of resource remaining is estimated for each monitored printer, further comprising displaying one graphical gauge indicating the estimated amount of the resource remaining for each monitored printer.

22. The method of claim 9, further comprising:

estimating a number of pages that can be processed with the estimated amount of the resource remaining; and generating information to display with the generated graphical element indicating the estimated number of pages.

23. The method of claim 9, wherein the monitored consumable resource is one of toner and fuser oil.

24. The method of claim 9, wherein the graphical display comprises a graphical gauge displaying a range of values from zero to a maximum capacity of the consumable resource in the monitored system, wherein the estimated amount of the consumable resource remaining is indicated on the gauge.

25. The method of claim 24, wherein the printer is a color printer, and wherein resource depletion is monitored for multiple color toners used in the monitored printer, wherein one gauge is displayed for each color toner in the printer, 26. The article of manufacture of claim 24, wherein the consumable resource is monitored at multiple printers and the amount of resource remaining is estimated for each monitored printer, further comprising displaying one graphical gauge indicating the estimated amount of the resource remaining for each monitored printer.

27. A system for monitoring depletion of a consumable resource, comprising:

(a) a monitored system that uses the consumable resource; and (b) a computer monitor; and (c) a processing unit in communication with the monitored system and the computer monitor, including:

(i) means for receiving information on at least one unit of work to be processed by the monitored system, wherein the monitored system would deplete the consumable resource when processing each unit of work;

(ii) means for determining a rate of resource depletion per unit of work processed;

(iii) means for estimating an amount of resource remaining after the monitored system processes the at least one unit of work, wherein the estimate is a function of the determined rate of resource depletion and a number of the one or more units of work remaining to be processed, wherein the means for estimating the amount of resource remaining further performs:

(A) multiplying a number of one or more units of work to process times the rate of resource depletion to estimate an amount of resource depletion that results from processing the at least one unit of work; and (B) setting the estimated amount of resource remaining to the estimated amount of resource remaining minus the estimated amount of resource depletion; and (iv) means for generating a graphical element for display on the computer monitor indicating the estimated amount of the resource remaining.

28. The system of claim 27, wherein the graphical display comprises a graphical gauge displaying a range of values from zero to a maximum capacity of the consumable resource in the monitored system, wherein the estimated amount of the resource remaining is indicated on the gauge.

29. The system of claim 27, wherein the processing unit further includes:
   means for receiving notification that the consumable resource is depleted in the monitored system; and
   means for determining an adjustment factor if the estimated amount of resource remaining is not estimated to be depleted, wherein the adjustment factor is applied when estimating the amount of resource remaining during use of the monitored system after the consumable resource is replenished in the monitored system.

30. The system of claim 27, further comprising:
   multiple systems using the consumable resource;
   wherein the processing unit is in communication with the multiple systems, and wherein the processing unit further includes:
   (i) means for monitoring the multiple systems;
   (ii) means for determining the estimated amount of resource remaining for each monitored system; and
   (iii) means for displaying at least one graphical element on the computer monitor for each monitored system indicating the estimated amount of the resource remaining for the monitored system.

31. The system of claim 27, wherein the processing unit further includes:
   means for initializing the estimated amount of resource remaining to full capacity, after the consumable resource is fully replenished.

32. A system for monitoring depletion of a consumable resource, comprising:
   (a) a printer; and
   (b) a computer monitor; and
   (c) a processing unit in communication with the printer and the computer monitor, comprising:
   (i) means for receiving a print job having print matter for at least one page;
   (ii) means for determining a rate of resource depletion per page;
   (iii) means for estimating an amount of resource remaining after the printer processes the print job as a function of a number of the at least one page in the print job and the determined rate of resource depletion, wherein the means for estimating the amount of resource remaining further performs:
      (A) multiplying a number of pages in the print job times the determined rate of resource depletion to estimate an amount of resource depletion at the printer when processing the print job; and
      (B) setting the estimated amount of resource remaining to the estimated amount of resource remaining minus the estimated amount of resource depletion; and
   (iv) means for generating a graphical element for display on a computer monitor indicating the estimated amount of the resource remaining.

33. The system of claim 32, wherein the processing unit further comprises:
   means for providing a data structure indicating one rate of resource depletion for different printers; and
   means for determining an identifier of the printer to print the print job, wherein determining the rate of resource depletion comprises determining the rate of resource depletion in the data structure corresponding to the determined identifier of the printer.

34. The system of claim 32, wherein the data structure provides rate of resource depletions for different material compositions used for the consumable resource, wherein the means for determining the rate of resource depletion further performs:
   determining a material composition of the consumable resource in the printer; and
   determining the rate of resource depletion in the data structure for the determined material composition.

35. The system of claim 32, wherein the processing unit further comprises:
   means for receiving notification from the printer that the consumable resource is depleted in the monitored printer; and
   means for determining an adjustment factor if the estimated amount of resource remaining is not estimated to be depleted, wherein the adjustment factor is applied when estimating the amount of resource remaining during use of the monitored printer after the consumable resource is replenished in the printer.

36. The system of claim 32, wherein the processing unit further includes:
   means for determining at least one attribute of the print job; and
   means for determining one attribute factor for each determined attribute of the print job, wherein the determined at least one attribute factor is used to estimate the amount of the resource remaining.

37. The system of claim 32, wherein the graphical display comprises a graphical gauge displaying a range of values from zero to a maximum capacity of the consumable resource in the monitored system, wherein the estimated amount of the consumable resource remaining is indicated on the gauge.

38. The system of claim 37, wherein the printer is a color printer, and wherein resource depletion is monitored for multiple color toners used in the monitored printer, wherein one gauge is displayed for each color toner in the printer.

39. The system of claim 37, wherein the consumable resource is monitored at multiple printers and the amount of resource remaining is estimated for each monitored printer, further comprising displaying one graphical gauge indicating the estimated amount of the resource remaining for each monitored printer.

40. The system of claim 32, wherein the processing unit further comprises:
   means for initializing the amount of resource remaining to full capacity, after the consumable resource is fully replenished.

41. An article of manufacture including code method for monitoring depletion of a consumable resource in a monitored system and displaying information on a computer monitor, wherein the code causes operations to be performed comprising:
   receiving information on at least one unit of work to be processed by the monitored system, wherein the monitored system would deplete the consumable resource when processing each unit of work;
   determining a rate of resource depletion per unit of work processed;
   estimating an amount of resource remaining after the monitored system processes the at least one unit of work, wherein the estimate is a function of the determined rate of resource depletion and a number of the one or more units of work remaining to be processed, wherein estimating the amount of resource remaining comprises:
  (i) multiplying a number of one or more units of work to process times the rate of resource depletion to estimate an amount of resource depletion that results from processing the at least one unit of work; and
  (ii) setting the estimated amount of resource remaining to the estimated amount of resource remaining minus the estimated amount of resource depletion; and
generating a graphical element for display on the computer monitor indicating the estimated amount of the resource remaining.

42. The article of manufacture of claim 41, wherein the graphical display comprises a graphical gauge displaying a range of values from zero to a maximum capacity of the consumable resource in the monitored system, wherein the estimated amount of the resource remaining is indicated on the gauge.

43. The article of manufacture of claim 41, wherein indicating the estimated amount of the resource remaining on the gauge comprises displaying a graphical needle on the gauge pointing to a position on the gauge indicating the estimated amount of the resource remaining.

44. The article of manufacture of claim 21, further comprising:
  estimating a number of units of work that can be processed with the estimated amount of the resource remaining; and
  generating information to display with the generated graphical element indicating the estimated number of units of work.

45. The article of manufacture of claim 41, further comprising:
  receiving notification that the consumable resource is depleted in the monitored system; and
  determining an adjustment factor if the estimated amount of resource remaining is not estimated to be depleted, wherein the adjustment factor is applied when estimating the amount of resource remaining during use of the monitored system after the consumable resource is replenished in the monitored system.

46. The article of manufacture of claim 41, further comprising:
  after the consumable resource is fully replenished, initializing the estimated amount of resource remaining to full capacity.

47. The article of manufacture of claim 41, further comprising:
  determining whether the estimated amount of the resource remaining indicates that the consumable resource is depleted in the monitored system; and
  generating a message indicating that there is not a sufficient amount of resource remaining to process the at least one unit of work if the resource is determined to be depleted in the monitored system.

48. The article of manufacture of claim 41, wherein multiple systems are monitored, wherein the estimated amount of resource remaining is determined for each monitored system, and at least one graphical element is displayed on the computer monitor for each monitored system indicating the estimated amount of the resource remaining for the monitored system.

49. An article of manufacture including code for monitoring depletion of a consumable resource in a printer, wherein the code causes operations to be performed comprising:
  receiving a print job having print matter for at least one page;
  determining a rate of resource depletion per page;
  estimating an amount of resource remaining after the printer processes the print job as a function of a number of the at least one page in the print job and the determined rate of resource depletion, wherein estimating the amount of resource remaining comprises:
    (i) multiplying a number of pages in the print job times the determined rate of resource depletion to estimate an amount of resource depletion at the printer when processing the print job; and
    (ii) setting the estimated amount of resource remaining to the estimated amount of resource remaining minus the estimated amount of resource depletion; and
  generating a graphical element for display on a computer monitor indicating the estimated amount of the resource remaining.

50. The article of manufacture of claim 49, further comprising:
  providing a data structure indicating one rate of resource depletion for different printers; and
  determining an identifier of the printer to print the print job, wherein determining the rate of resource depletion comprises determining the rate of resource depletion in the data structure corresponding to the determined identifier of the printer.

51. The article of manufacture of claim 50, wherein the identifier of the printer comprises one of a printer model and a unique name of the printer that will process the print job.

52. The article of manufacture of claim 50, wherein the data structure provides rate of resource depletions for different material compositions used for the consumable resource, wherein determining the rate of resource depletion further comprises:
  determining a material composition of the consumable resource in the printer; and
  determining the rate of resource depletion in the data structure for the determined material composition.

53. The article of manufacture of claim 49, further comprising:
  receiving notification from the printer that the consumable resource is depleted in the monitored printer; and
  determining an adjustment factor if the estimated amount of resource remaining is not estimated to be depleted, wherein the adjustment factor is applied when estimating the amount of resource remaining during use of the monitored printer after the consumable resource is replenished in the printer.

54. The article of manufacture of claim 49, further comprising:
  after the consumable resource is fully replenished, initializing the amount of resource remaining to full capacity.

55. The article of manufacture of claim 49, further comprising:
  determining whether the estimated amount of the resource remaining indicates that the consumable resource is depleted in the monitored printer; and
  generating a message indicating that there is not a sufficient amount of the resource remaining to process the number of pages in the print job if the resource is determined to be depleted in the monitored system.

56. The article of manufacture of claim 49, further comprising:
  determining at least one attribute of the print job; and determining one attribute factor for each determined attribute of the print job, wherein the determined at least one attribute factor is used to estimate the amount of the resource remaining.

57. The article of manufacture of claim 56, wherein the consumable resource comprises toner and wherein the determined attributes of the print job include contrast and boldness.

58. The article of manufacture of claim 57, further comprising:

providing a contrast table and boldness table providing different contrast and boldness factors, respectively, for different contrast and boldness settings.

59. The article of manufacture of claim 49, further comprising:

estimating a number of pages that can be processed with the estimated amount of the resource remaining; and generating information to display with the generated graphical element indicating the estimated number of pages.

60. The article of manufacture of claim 49, wherein the monitored consumable resource is one of toner and fuser oil.

* * * * *